United States Patent
Salgado et al.

(10) Patent No.: US 8,082,238 B1
(45) Date of Patent: Dec. 20, 2011

(54) METHOD AND APPARATUS FOR MANAGING SOFTWARE COPYRIGHT YEARS IN A MULTIPLE PLATFORM ELECTRONIC REPROGRAPHICS SYSTEM

(75) Inventors: David L. Salgado, Victor, NY (US); Russell R. Roberts, Webster, NY (US); Dennis Ulrich, Fairport, NY (US); Gary R. Kern, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 743 days.

(21) Appl. No.: 09/448,804

(22) Filed: Nov. 24, 1999

(51) Int. Cl.
*G06F 17/00* (2006.01)
*G06F 7/00* (2006.01)

(52) U.S. Cl. ...................................................... 707/695

(58) Field of Classification Search .................. 707/204, 707/203, 201, 104, 615; 709/220, 238; 395/200; 717/11, 171–178; 705/57, 7, 14; 713/201
See application file for complete search history.

(56) References Cited

U.S. PATENT DOCUMENTS

| | | | | |
|---|---|---|---|---|
| 5,822,532 A | * | 10/1998 | Ikeda | |
| 5,835,911 A | * | 11/1998 | Nakagawa et al. | 707/203 |
| 5,842,023 A | * | 11/1998 | Tsumura | 717/170 |
| 6,151,624 A | * | 11/2000 | Teare et al. | 709/217 |
| 6,189,146 B1 | * | 2/2001 | Misra et al. | 717/177 |
| 6,301,710 B1 | * | 10/2001 | Fujiwara | 717/175 |
| 6,476,927 B1 | * | 11/2002 | Schwarz, Jr. | 358/1.15 |
| 7,350,084 B2 | * | 3/2008 | Abiko et al. | 713/193 |
| 2002/0073035 A1 | * | 6/2002 | Saito | 705/52 |
| 2003/0159065 A1 | * | 8/2003 | Nakagawa et al. | 713/201 |

OTHER PUBLICATIONS

IBM Technical Disclosure Bulletin, "Strategy for Collecting Software Inventory Information Across a Local Area Network", Dec. 1, 1994, IBM, vol. 37, pp. 1-3.*

* cited by examiner

*Primary Examiner* — Sathyanarayan Pannala

(57) ABSTRACT

The invention relates to a multiple platform architecture data reporting system for managing attribute data. The system comprises: a system manager for collecting attribute data from multiple platforms and a user interface connected to the system manager for displaying the collected attribute data to a user. Also disclosed is a method for managing attribute data in a multiple platform architecture comprising the steps of polling at least two platforms for attribute data, collecting the attribute data from the at least two platforms in response to the step of polling, and then displaying the collected attribute data on a user display.

15 Claims, 5 Drawing Sheets

METHOD AND APPARATUS FOR MANAGING SOFTWARE COPYRIGHT YEARS IN A MULTIPLE PLATFORM ELECTRONIC REPROGRAPHICS SYSTEM

BACKGROUND OF THE INVENTION

1. Field of the Invention

The present invention relates to a multiple platform architecture data reporting system and, more particularly, to automatic reporting and displaying of information.

2. Prior Art

Referring to FIG. 1, there is shown a perspective view of a document processing apparatus 10. The apparatus 10 could be any suitable type of document processing apparatus, such as a copier, a facsimile machine, a scanner, a computer printer, or a multifunction device having two or more functions. The apparatus may be comprised of multiple platforms where each platform contains its own processor and software. In addition, each platform manages and maintains its own software copyright information.

The copyright to a software program subsists from the time the program is fixed in a tangible medium and does not explicitly require a display of copyright (Berne Convention Implementation Act of 1988, Pub. L. No. 100-568 (1988)). However, to protect against inadvertent forfeiture of a copyright, display of copyright is still desirable for pre-Berne works and in some non-Berne Convention countries. In addition, notice of copyright can prevent an infringer, having access to a copy bearing the notice, from claiming innocence as a defense.

When notice is required or desired, updated software generally includes the year of the update in addition to the year of the original work. Failure to notice the copyright year for the original work could result in forfeiture of the copyright if the software update, when combined with the original work, is not considered sufficient. Thus, as a precautionary measure, copyright years are noticed for the original software and for software updates to the original software. Systems comprised of multiple platforms, each with multiple software packages and software updates, may require notice of all original copyright years as well as notice of copyright for all software updates and other software attributes.

SUMMARY OF THE INVENTION

A multiple platform architecture data reporting system for managing attribute data in a document processing apparatus features a system manager and at least one platform controller. The system manager: collects attribute data including copyright data pertaining to software from each platform controller; recognizes the copyright data in the attribute data; and processes the copyright data into a list of copyright data for the system. A user interface displays the collected attribute data in the list to a user.

A method for managing attribute data in a document processing apparatus features a system controller polling at least two platform controllers for attribute data. The system manager collects the attribute data from the at least two platform controllers in response to the polling; and displays the collected attribute data on a user display of the document processing apparatus for managing attribute data in the document processing apparatus.

A software copyright information managing system for managing software copyright data in a document processing apparatus features a system controller, and at least one platform controller. The system controller collects the software copyright data stored on each platform controller; and a user interface displays the software copyright data from a memory to a user.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
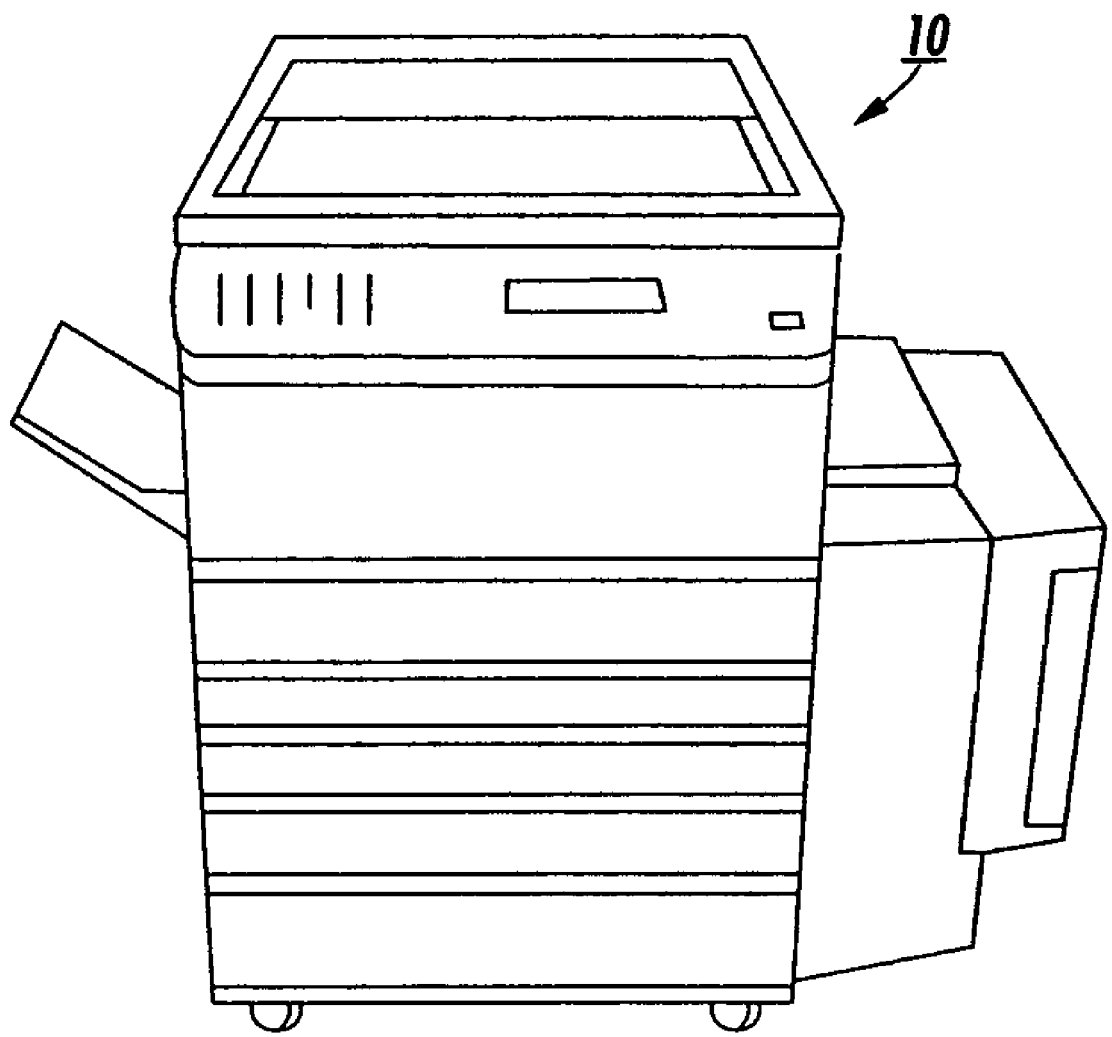
FIG. 1 is a perspective view of a conventional document processing apparatus.

Referring to FIG. 1, there is shown a perspective view of a document processing apparatus 10 similar to a document processing apparatus incorporating features of the present invention. Although the present invention will be described with reference to the embodiments shown in the drawings, it should be understood that the present invention can be embodied in many alternate forms of embodiments.

Figure 2:
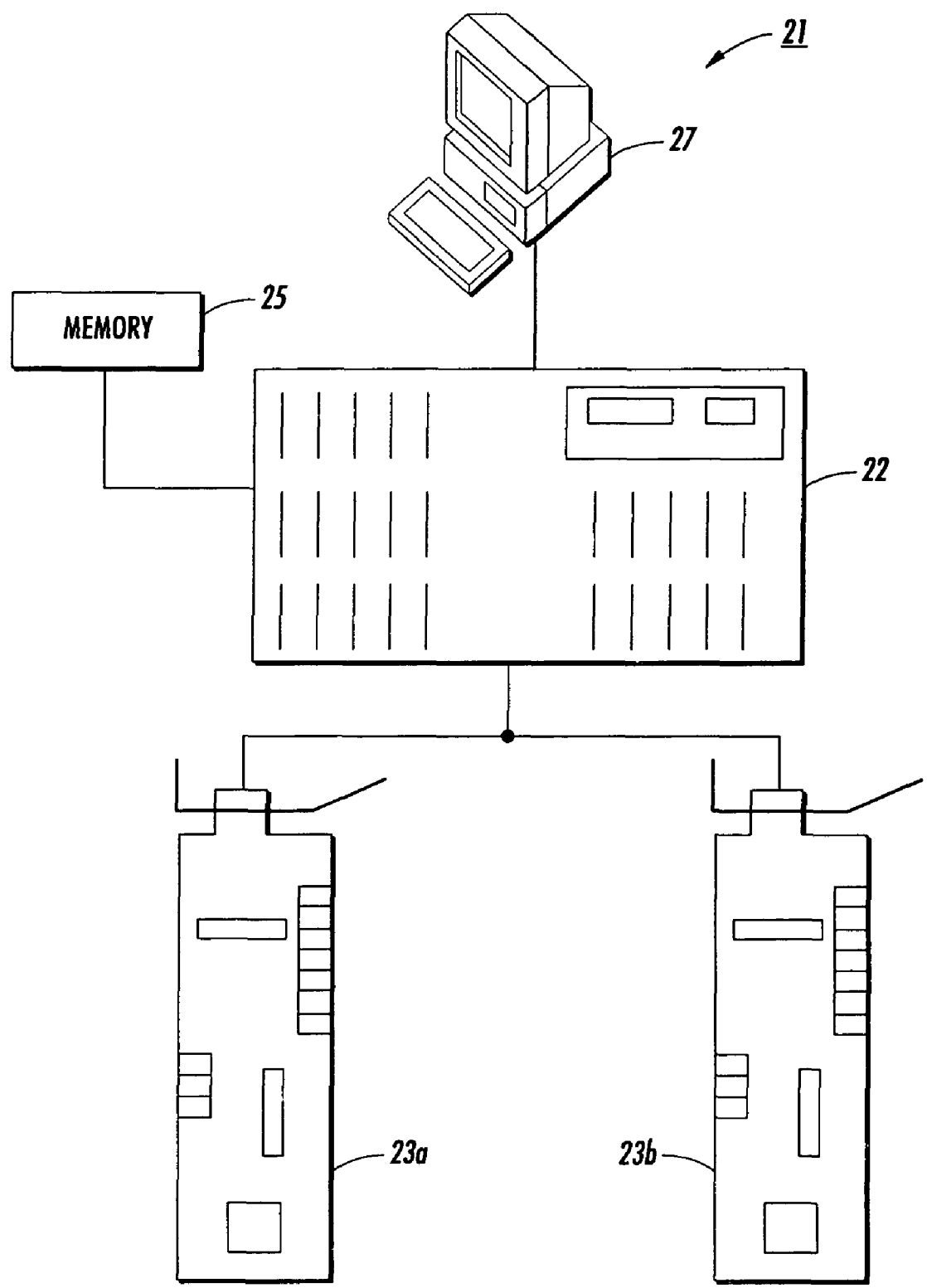
FIG. 2 is a schematic diagram of a copyright management system incorporating features of the present invention.

Referring now to FIG. 2 there is shown a block diagram of one embodiment of copyright management system 21 incorporating features of the present invention. The copyright management system 21 is generally intended to be used for managing software copyright information and other software attribute data in a document processing apparatus such as described above with reference to FIG. 1 (e.g.: a copier, a facsimile machine, a computer printer, a scanner, or a multifunction device). The copyright management system 21 generally comprises a system manager 22, at least two platform controllers 23a,23b, memory 25, and a user interface 27.

The system manager 22 generally comprises any suitable control module designated as the system manager. The system manager coordinates the system's platform-wide operations (such as power ON) and owns system level attributes. One attribute is the comprehensive copyright years list for all the platforms that comprise the system.

The hardware platform controller cards 23a, 23b generally comprise any suitable module designated as the platform manager. Each hardware platform controller card maintains a list of the software copyright years relevant to the software on its platform. Each hardware platform controller card 23a, 23b passes the copyright information to the system manager at power ON or when initiated by a user request from the system manager.

Memory 25 comprises any suitable data storage medium capable of storing information data, such as copyright years as reported by the platform controllers. Memory may be volatile or non-volatile.

The user interface 27 generally comprises a display for displaying copyright information and a user input device for providing instruction to the system manager. The user interface display may be any suitable medium such as a screen or hardcopy printout for displaying copyright information and any suitable user input device such as a keyboard.

Figure 3:
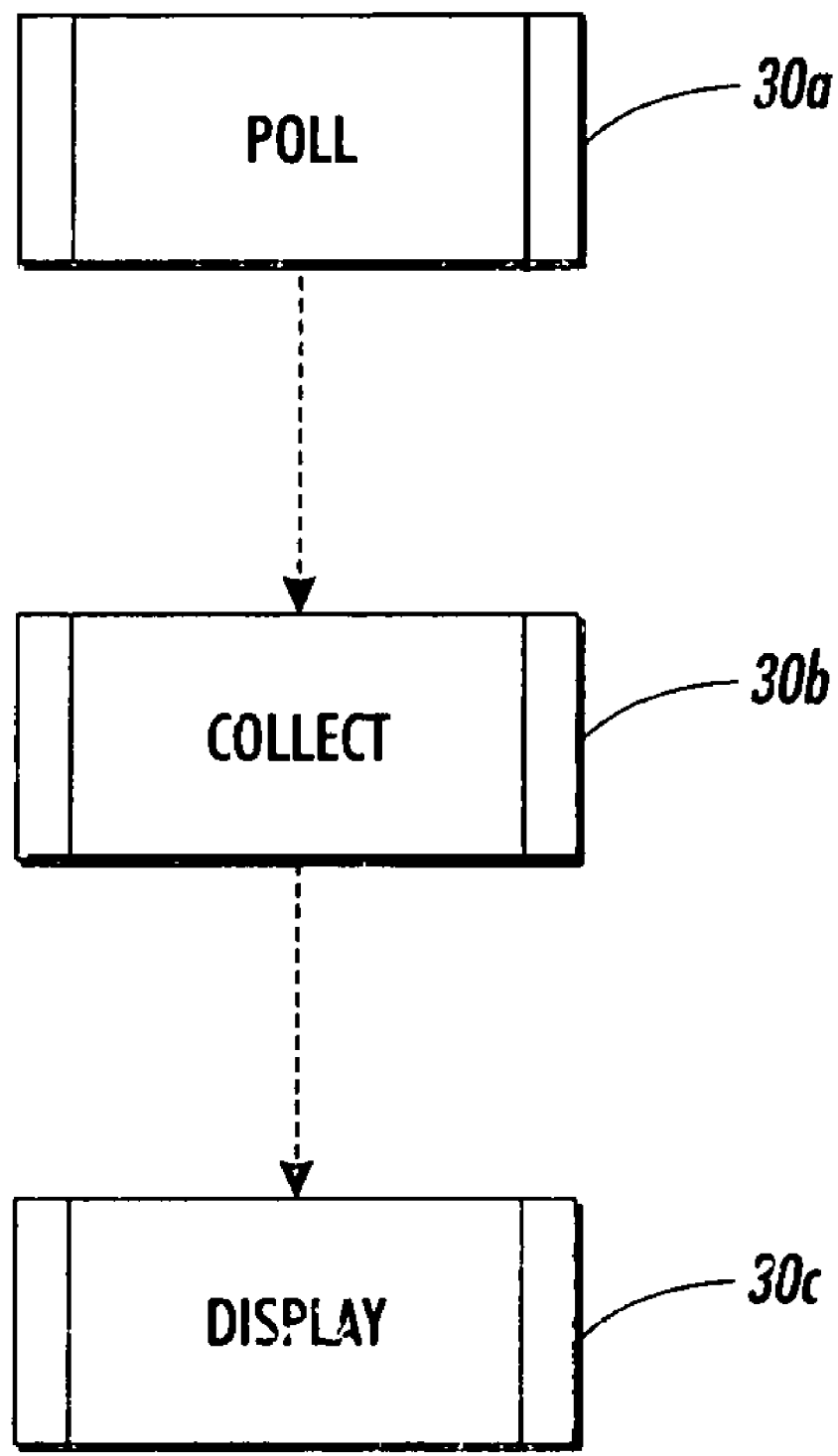
FIG. 3 is a flowchart of a method for managing copyright data using the system shown in FIG. 2.
Figure 4:
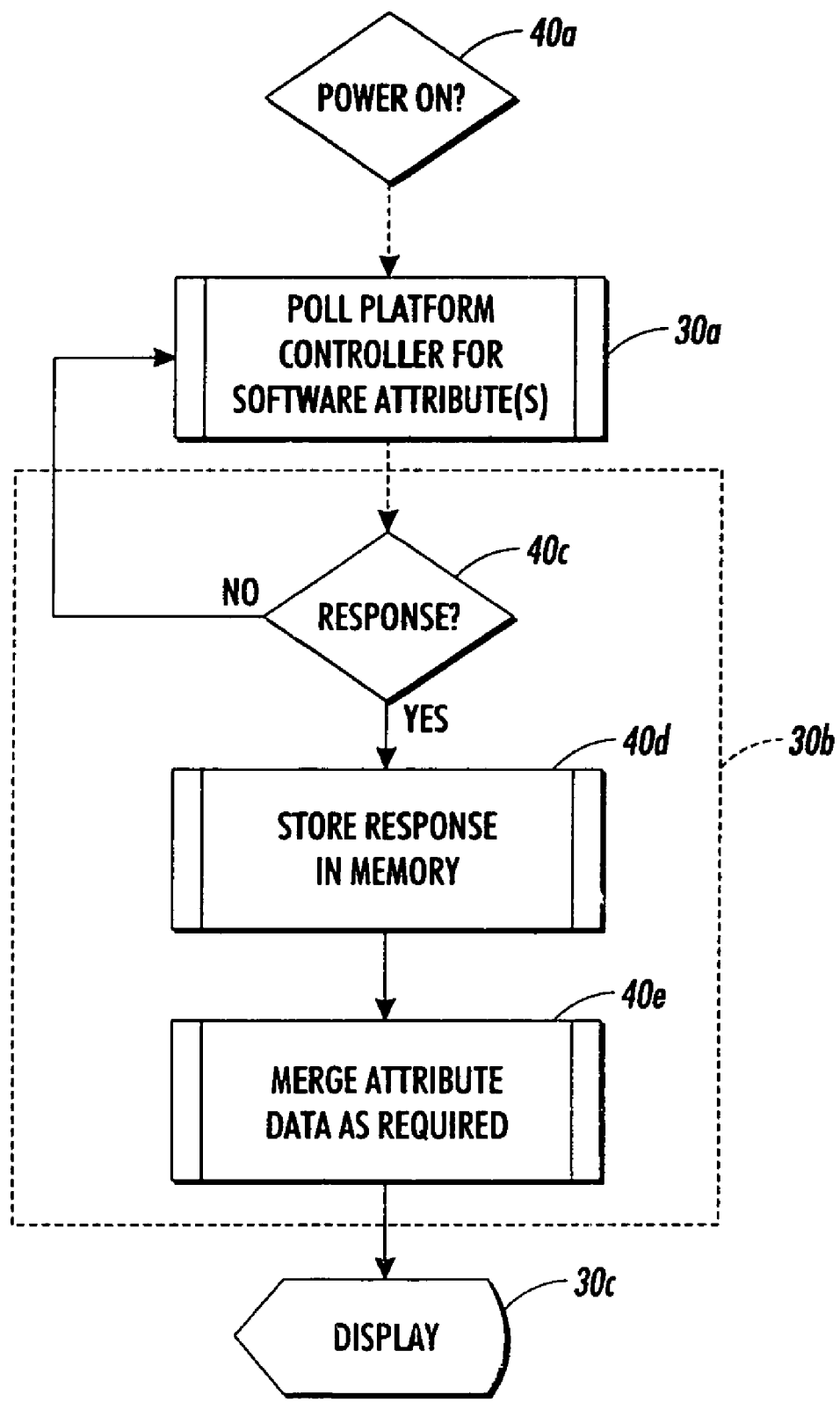
FIG. 4 is an exploded flowchart of the method for managing copyright data shown in FIG. 3.

Referring also to FIG. 3 there is shown a flowchart of one method for managing copyright information using the system shown in FIG. 2. In short, the system polls 30a, collects 30b, and displays 30c, to manage copyright information for the system. These steps are further illustrated with reference to FIGS. 2 and 4. At power ON 40a, each platform controller 23a, 23b is polled 30a and reports its attribute data (i.e., copyright data, licenses data or any other suitable type of software data) to the system manager 22 in response 40c to the system manager's polling. The system manager stores 40d the attribute responses in memory 25. The system manager 22 merges 40e the data reported by each of the platform managers 23a,23b, in this example, with its current set of system attribute data held by the system manager 22 in memory 25. The system manager 22 then displays 30c the differing attribute information as an attribute for the compilation of the various platform modules. For example, if platform 23a reports as an attribute a copyright years list of 1994, 1995, and 1996 and platform 23b reports a copyright years list of 1995, 1996, 1997, and 1998 then the system manager will store the lists as reported in memory and display the copyright years 1994, 1995, 1996, 1997, and 1998. In addition, any platform not reporting 40c its copyright years list is continued to be polled until the platform responds or until a predetermined amount of time has elapsed at which time the system manager reports a failure message to the user interface display. Alternatively, the system manager could display the software copyright years from each platform as reported by the platform or store the data for later retrieval.

Figure 5:
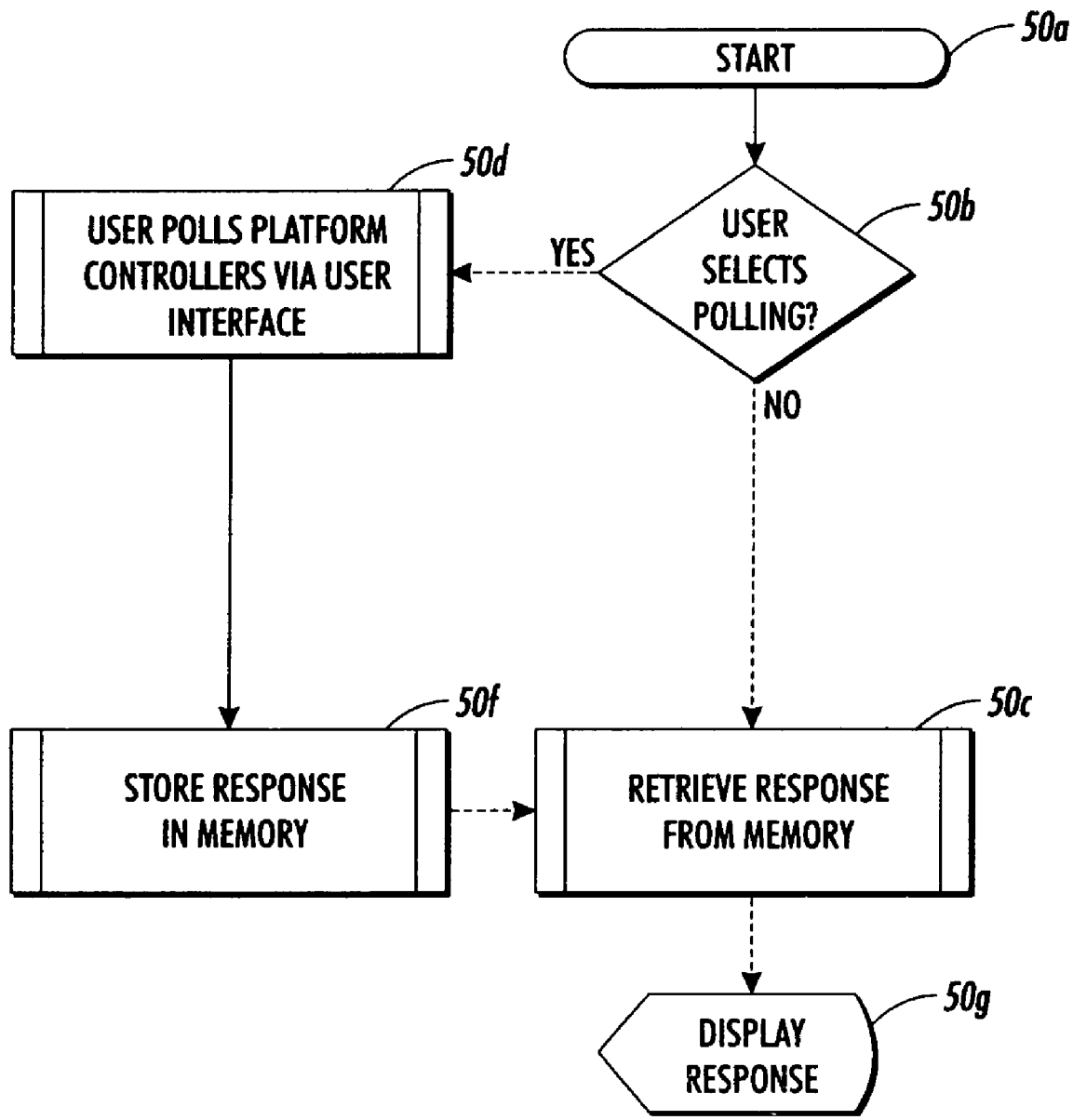
FIG. 5 is an exploded flowchart of an alternate method for managing copyright data shown in FIG. 3.

Referring to FIG. 5, at any point past power ON a user can initiate 50a a copyright years request via the user interface. The user can select 50b either polling 50d the platform controllers 23a,23b, or retrieving 50c the previous response stored in memory 25 by the system manager 22. The system manager 22 then displays 50g the differing copyright years information on the user interface display as described above. Alternatively, the system manager could display the software copyright years from each platform as reported by the platform or store the data for later retrieval.

It should be understood that the foregoing description is only illustrative of the invention. Various alternatives and modifications can be devised by those skilled in the art without departing from the invention. For example, the invention could have two platform controllers as represented by 23a and 23b in FIG. 2 or the invention could have more than two platforms. Accordingly, the present invention is intended to embrace all such alternatives, modifications and variances which fall within the scope of the appended claims.

What is claimed is:

1. A multiple platform architecture data reporting system for managing attribute data in a document reproduction apparatus, the system comprising:
    at least one hardware platform controller card configured to store copyright attributes of software stored on the at least one hardware platform controller card;
    a system manager connected to a memory and configured to poll the at least one hardware platform controller card for the software copyright attributes, to collect the software copyright attributes from the at least one hardware platform controller card in the memory, and to merge the software copyright attributes reported by each hardware platform controller card into a compilation of software copyright attributes of all of the hardware platform controller cards; and
    a user interface connected to the system manager for displaying the compilation of software copyright attributes of all of the hardware platform controller cards to a user.

2. The system of claim 1 wherein the system manager collects the software copyright attributes at power on of the at least one hardware platform controller card.

3. The system of claim 1 wherein the compilation of software copyright attributes of all the hardware platform controller cards comprises a list of copyright years for software stored on all the hardware platform controller cards.

4. The system of claim 1 wherein the software copyright attributes comprise copyright and license data.

5. The system of claim 1 wherein the document reproduction apparatus is a copier, a fax machine, a computer printer, a scanner or a multifunction device.

6. A method for managing attribute data in a document reproduction apparatus, the method comprising:
    using one or more hardware platform controller cards of the document reproduction apparatus for storing copyright attributes of software stored on each hardware platform controller card;
    using a system manager in the document reproduction apparatus to poll the one or more hardware platform controller cards for the software copyright attributes;
    using the system manager to collect the software copyright attributes from each of the hardware platform controller cards in response to the polling, and to merge the software copyright attributes reported by each hardware platform controller card into a compilation of software copyright attributes for all of the hardware platform controller cards; and
    using a display of the document processing apparatus to display the compilation of software copyright attributes.

7. The method of claim 6 wherein using the system manager to poll the one or more hardware platform controller cards for the software copyright attributes further comprises automatically polling the one or more hardware platform controller cards at power on of the one or more hardware platform controller cards.

8. The method of claim 6 wherein using the system manager to poll the one or more hardware platform controller cards for the software copyright attributes further comprises polling at least one of the hardware platform controller cards when polling is initiated by a user request.

9. The method of claim 6 wherein using the system manager to collect the software copyright attributes from each of the hardware platform controller cards in response to the polling further comprises collecting license information from each of the hardware platform controller cards.

10. The method of claim 6 wherein the document reproduction apparatus is a copier, a fax machine, a computer printer, a scanner or a multifunction device.

11. The method of claim 6 wherein using the display of the document processing apparatus to display the compilation of software copyright attributes further comprises automatically displaying the compilation of software copyright attributes.

12. The method of claim 6 wherein the displaying the collected attribute data on a user display using a display of the document processing apparatus to display the compilation of software copyright attributes further comprises manually displaying the compilation of software copyright attributes.

13. A software copyright information managing system embodied on a non-transitory computer readable storage medium for managing software copyright attributes in a document reproduction apparatus, the system comprising:
    at least one platform controller stored on said non-transitory computer readable storage medium and configured to store copyright attributes of software stored on the at least one platform controller;

a system manager stored on said non-transitory computer readable storage medium and configured to poll the at least one platform controller for the software copyright attributes, to collect the software copyright attributes from the at least one platform controller, and to merge the software copyright attributes reported by each platform controller into a compilation of software copyright attributes of all of the platform controllers; and a user interface connected to the system manager for displaying the software copyright attributes of all of the platform controllers.

14. The software copyright information managing system of claim 13 wherein the system manager further comprises a memory for storing the collected software copyright attributes.

15. The software copyright information managing system of claim 14 wherein the document reproduction apparatus is a copier, a fax machine, a computer printer, a scanner or a multifunction device.

* * * * *